United States Patent [19]

Casey et al.

[11] Patent Number: 4,794,412

[45] Date of Patent: Dec. 27, 1988

[54] VERTICAL LINE WIDTH CONTROL IONOGRAPHIC SYSTEM

[75] Inventors: Brendan C. Casey, Webster; William L. Gary, Lyons, both of N.Y.

[73] Assignee: Xerox Corporation, Stamford, Conn.

[21] Appl. No.: 194,238

[22] Filed: May 16, 1988

[51] Int. Cl.[4] .................... G01D 15/00

[52] U.S. Cl. .................... 346/154; 346/154

[58] Field of Search .................... 346/150, 153.1, 154, 346/139 R, 158, 159; 364/518-523; 358/300; 400/119; 101/DIG. 13; 361/235

[56] References Cited

U.S. PATENT DOCUMENTS

| | | | |
|---|---|---|---|
| 4,463,363 | 7/1984 | Gundlach et al. | 346/159 |
| 4,558,334 | 12/1985 | Fotland | 346/159 |
| 4,658,275 | 4/1980 | Fugii et al. | 346/154 |
| 4,697,196 | 9/1987 | Inaba et al. | 346/154 |

*Primary Examiner*—Arthur G. Evans
*Attorney, Agent, or Firm*—Ronald F. Chapuran

[57] ABSTRACT

The adjustment of the strobe and data voltages to the array gates that drive each of the modulators in an ionographic printing device, in particular the lowering of the data voltage level below the strobe voltage level for each of the array gates. The lower limit on the data voltage level is the voltage level where the generated ions are not shut off completely at the modulating electrode.

8 Claims, 4 Drawing Sheets

VERTICAL LINE WIDTH CONTROL IONOGRAPHIC SYSTEM

BACKGROUND OF THE INVENTION

The present invention relates to ionographic systems for creating images and, in particular, to the method and apparatus to control the vertical line width in such images in ionographic systems.

The problem of cross talk between adjacent electrodes in an ionographic print head is known. For example, U.S. Pat. No. 4,558,334 discloses a two electrode ion generator producing ions only during the print period requiring reduced power to achieve given ion outputs, and includes low impedance gated oscillators to reduce capacitive cross-talk between the electrodes.

In some ionographic systems, the problem of cross-talk manifests itself in the difficulty of producing vertical lines in created images. In such systems there is generally an array of adjacent modulating electrodes, each of the electrodes being driven by a gate receiving a strobe voltage and a data voltage to reproduce a black or white spot corresponding to a digital image. The cross-talk phenomenon, for example, is evidenced by vertical lines in the reproduced images that tend to start light and get darker as thy continue in the vertical direction until reaching a stable thickness and density. Also, the stable thickness is often too thin to the point that 1 bit vertical lines (lines of 1 bit or spot length) are virtually non-existent, and 2 bit vertical lines are approximately equal in width to a 1 bit horizontal line.

It is an object of the present invention, therefore, to provide a new and improved method and apparatus to control cross-talk in an ionographic printing device and in particular, to provide uniform and consistent vertical lines in images created by the ionographic printing device.

Further advantages of the present invention will become apparent as the following description proceeds, and the features characterizing the invention will be pointed out with particularity in the claims annexed to and forming a part of this specification.

SUMMARY OF THE INVENTION

Briefly, the present invention is the adjustment of the strobe and data voltages to the array gates that drive each of the modulators in an ionographic printing device, in particular the lowering of the data voltage level below the strobe voltage level for each of the array gates. The lower limit on the data voltage level is the voltage level where the generated ions are not shut off completely at the modulating electrode.

For a better understanding of the present invention reference may be had to the accompanying drawings wherein the same reference numerals have been applied to like parts and wherein.

Figure 3:
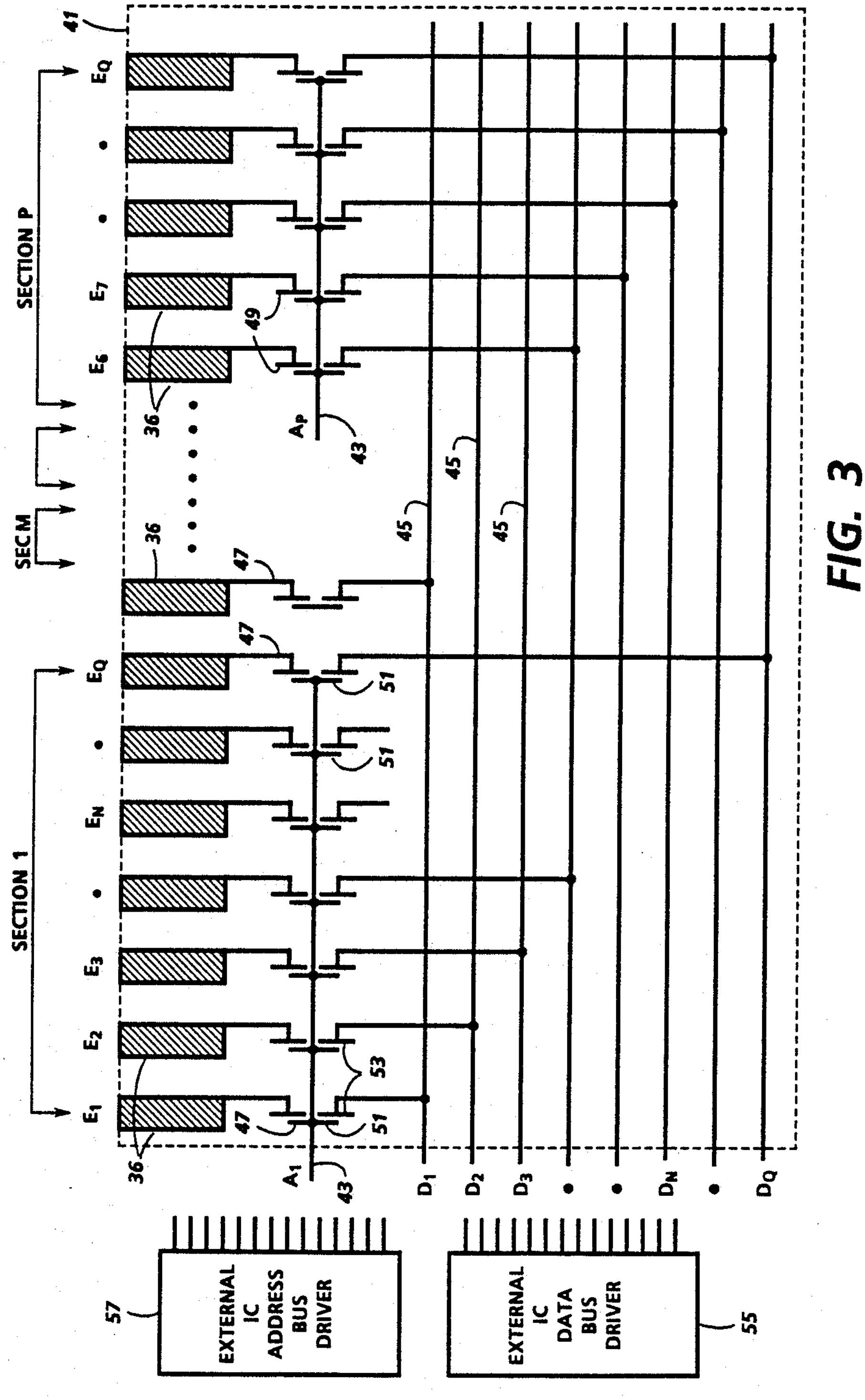

FIG. 3 a schematic representation of the marking head of the present invention showing the modulation electrodes, the switching elements and the multiplexed driver circuitry; and FIGS. 4*a*–4*e* illustrate vertical line width control and cross-talk elimination in accordance with the present invention.

DETAILED DESCRIPTION OF THE INVENTION

Figure 1:
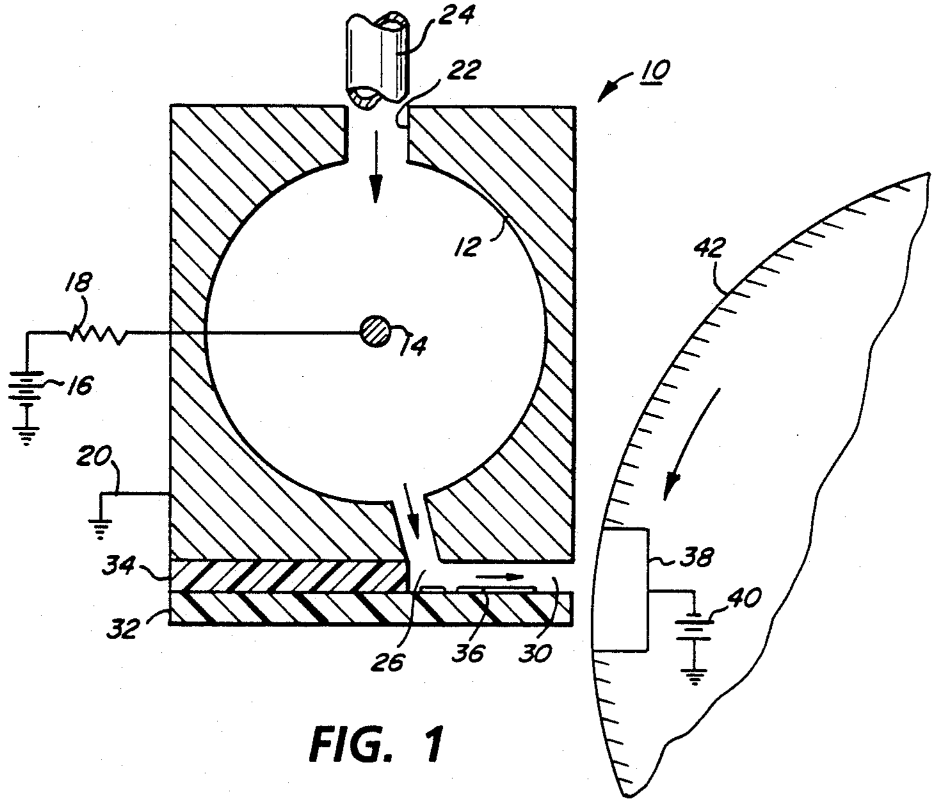
FIG. 1 is a schematic of a print head for use with the present invention.

With particular reference to the drawings, there is illustrated in FIG. 1 a housing 10 which includes an electrically conductive, elongated chamber 12 and a corona discharge wire 14, extending along the length of the chamber. A high potential source 16, on the order of several thousand volts dc, is connected to the wire 14 through a suitable load resistor 18, and a reference potential source 20 (which may be ground) is connected to the wall of chamber 12. Upon application of the high potential to corona discharge wire 14, a corona discharge surrounds the wire, creating a source of ions of a given polarity (preferably positive), which are attracted to the grounded chamber wall and fill the chamber with a space charge.

An inlet channel 22 extends along the chamber substantially parallel to wire 14 to deliver pressurized transport fluid (preferably air) into the chamber 12 from a suitable source, schematically illustrated by the tube 24. An outlet channel 26, from the chamber 12, also extends substantially parallel to wire 14, at a location opposed to inlet channel 22, for conducting the ion laden transport fluid to the exterior of the housing 10. The outlet channel 26 comprises two portions, a first portion directed substantially radially outwardly from the chamber and a second portion 30 angularly disposed to the first portion. The second portion 30 is formed by the unsupported extension of a marking head 32 spaced from and secured to the housing by insulating shim 34. As the ion laden transport fluid passes through the outlet 26, it flows over an array of ion pixel or modulation electrodes 36, each extending in the direction of the fluid flow, and integrally formed on the marking head 32.

Ions allowed to pass completely through and out of the housing 10, through the outlet channel 26, come under the influence of accelerating back electrode 38 which is connected to a high potential source 40, on the order of several thousand volts dc, of a sign opposite to that of the corona source 16. An insulating charge receiver 42, is interposed between the accelerating back electrode and the housing, and is moved over the back electrode for collecting the ions upon its surface in an image configuration. Once the ions have been swept into the outlet channel 26 by the transport fluid, it becomes necessary to render the ion-laden fluid stream intelligible. This is accomplished by selectively controlling the potential on modulation electrodes 36 by any suitable means.

As described in U.S. Pat. No. 4,463,363, incorporated herein once the ions in the transport fluid stream come under the influence of the modulation electrode, they may be viewed as individual "beams", which may be allowed to pass to the receiver 42 or to be suppressed within the outlet channel. "Writing" of a single spot in a raster line is accomplished when the modulation electrode is selectively connected to a potential source at substantially the same potential as that on the opposing wall of the outlet channel. With both walls bridging the channel being at about the same electrical potential, there will be substantially no electrical field extending thereacross. Thus, ions passing therethrough will be unaffected and will exit the housing to be deposited upon the charge receptor.

Conversely, when a suitable potential is applied to the modulation electrode, a field will extend across the outlet channel to the opposite, electrically grounded, wall. If the electrical potential imposed on the modulation electrode is of the same signal as the ions, the ion "beam" will be repelled from the modulation electrode to the opposite wall where the ions may recombine into uncharged, or neutral, air molecules. If the electrical potential imposed on the modulation electrode is of the opposite sign as the ions, the ion "beam" will be attracted to the modulation electrode where they may recombine into unchanged or netural, air molecules. Therefore, that "beam" of transport fluid, exiting from the housing in the vicinity of that modulation electrode, will carry substantially no "writing" ions.

An imagewise pattern of information will be formed by selectively controlling each of the modulation electrodes in the array so that the ion beams associated therewith either exit or are inhibited from exiting the housing in accordance with the pattern and intensity of light and dark spots of the image to be reproduced. It should be understood that the image to be reproduced is generally a digital image and that each light and dark spot is generally represented by a binary 0 or 1.

Figure 2:
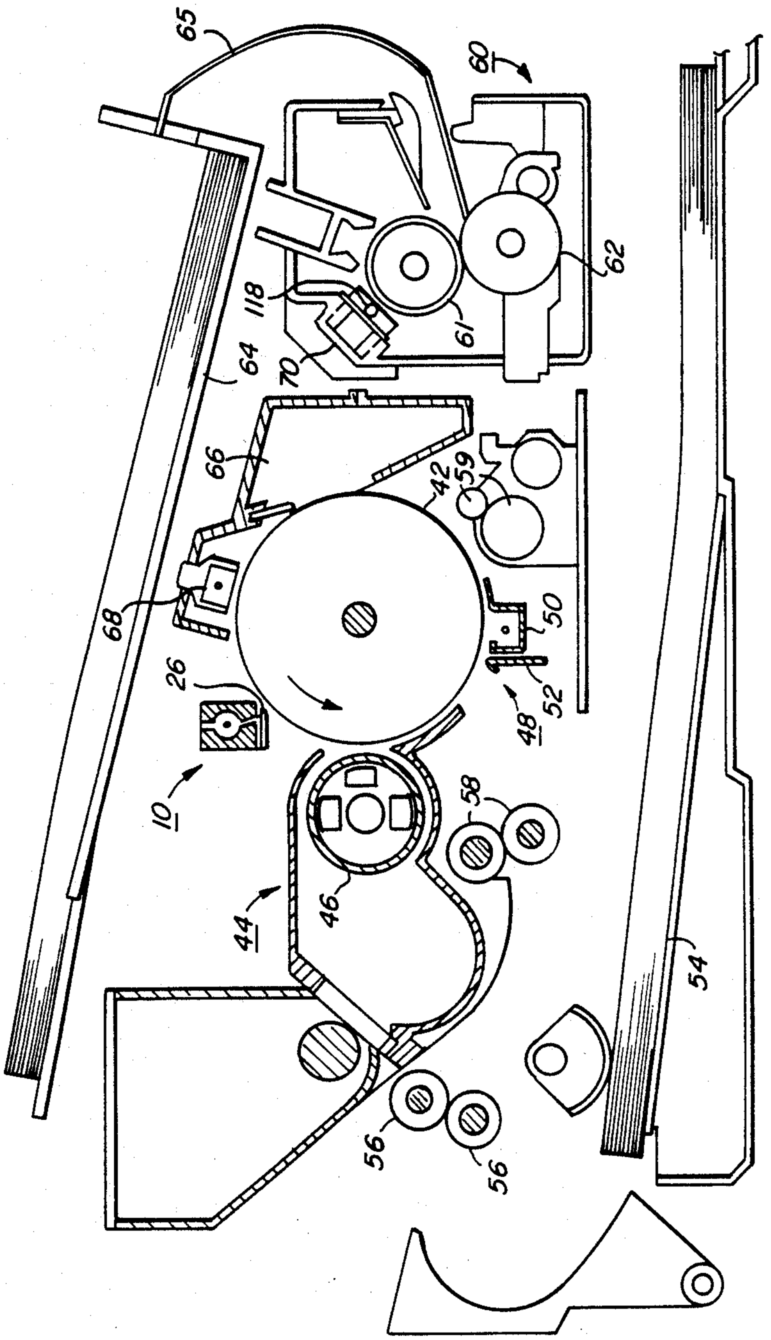
FIG. 2 is an elevational view depicting an electrographic printing machine incorporating the present invention.

With reference to FIG. 2, there is disclosed in general a printing apparatus in accordance with the present invention. Initially, the receiver 42, a substrate supporting any suitable electrostatic material is charged to a background voltage, in a preferred embodiment, approximately −1500 volts. The receiver 42 is rotated in a direction of the arrow passed the outlet channel 26 of the fluid jet assisted ion projection apparatus. The charge pattern corresponding to the image to be reproduced is projected onto the surface of the receiver 42 providing a latent image. Upon further rotation of the receiver to a developer station (generally shown at 44), suitable developer rolls 46 such as magnetic development rolls advance a developer material into contact with the electrostatic latent image. The latent attracts toner particles from the carrier granules of the developer material to form a toner powder image upon the surface of the receiver.

The receiver 42 then advances to a transfer station shown generally at 48 where a copy sheet is moved into contact with the powder image. The transfer station 48 includes a transfer corotron 50 for spraying ions onto the backside of the copy sheet and also includes a pretransfer baffle generally shown at 52. Copy sheets are fed from selected trays, for example, tray 54 and conveyed through a suitable copy sheet paper path, driven by suitable rolls such as rolls 56 and 58 to the transfer station.

After transfer, the copy sheet are driven to a fuser station including fusing rolls for permanently affixing the transferred powder image to the copy sheet. Preferably, the fuser assembly includes a heated fuser roll 60 and backup or pressure roll 62 with the sheet passing therebetween. After fusing, the copy sheet is transported to a suitable output tray such as illustrated at 64. In addition, a suitable cleaner 66, for example, a blade cleaner in contact with the receiver surface removes residual particles from the surface. Finally, an erase scorotron 68 neutralizes the charge on the receiver and recharges the receiver to the background voltage.

The marking head 32 comprises the elements schematically illustrated in FIG. 3 supported upon a planar substrate 41 (represented by the dotted outline). These elements include an array of modulation electrodes (E) 36 and a multiplexed data entry or loading circuit, comprising a small number of address bus lines (A) 43 and data bus lines (D) 45. Each of the modulation electrodes in the array is individually switchable while simultaneously reducing the number of wire bonds required to interface the electrodes with the external driver circuits. Thin film switches 47 are fabricated directly on the marking head between the electrodes 36 and the data bus lines 45 connected so that no wire bonds are required.

For simplicity of fabrication over the large area, full page-width head, the switches 47 are preferably amorphous silicon thin film transistors (a-Si:H TFTs), although other materials such as polycrystalline Si, laser annealed Si, CdS, Te, or ZnO may be used. As shown, each modulation electrode 36 is connected to the drain electrode 49 of the thin film transistor, an address bus line 43 (connected to a strobe voltage) is connected to the gate electrode 51 and a data bus line 45 is connected to a data voltage is connected to source electrode 53. Since the number of address bus lines and data bus lines is reduced to a very small number through a multiplexing scheme, the number of wire bonds required will be kept to a minimum. Wire bonding will be necessary between external IC address bus drivers 57 and the address bus line 43, and between the external IC data bus drivers 55 and the data bus lines 45.

A low cost marking head incorporates modulation electrodes, thin film switching devices, address and data buses, all integrally fabricated upon a single, inexpensive substrate as shown. It includes a-Si:H TFT switches which, ordinarily, would be discarded out of hand, as switching devices for a high speed printer because of their relatively small current capability, resulting in their relatively slow response time. However, when used in the fluid jet assisted ion projection electrographic marking apparatus, it has been shown that they are uniquely compatible. This is because (a) the fluid jet assisted ion printing process is controlled by modulation electrodes which do not need to draw current during "writing" and hold their charges for the entire line time, and (b) because the a-Si:H TFT switches do not allow the charge to be drained away during their OFF state, and their charging time is shorter than the system loading time.

Generally, horizonal 1 bit wide black lines print out with little difficulty. However, in transitioning from all white to 1 on, 1 off vertical 1 bit wide black lines, the lines will be initially washed out, then progressively get darker until reaching a constant width. As illustrated in FIGS. *4a–4e*, each of the pixel or array modulation electrodes 36 receives an electrode voltage from switch 47 that is a function of the strobe voltage at gate electrode 51 and the data voltage at source electrode 53 to the transistor switch 47 for that particular modulation electrode 36. It has been discovered that the vertical black line problem has been caused by the voltage leakage or cross-talk between adjacent modulation electrodes 36 on the electrode array.

Assume that a white dot is written when the modulating electrode 36 voltage is relatively high and that a black dot is written when the modulating electrode 36 voltage is relatively low. The problem is not going from a black dot to a white dot. Nor is the problem that the black modulating electrode 36 does not go to zero, although the leakage from neighboring electrodes will increase the zero voltage electrodes to some positive voltage. The problem is that the neighboring pixel electrodes 36 overcharge and over modulate. This also increases the leakage and increases the voltage on 0 voltage pixel electrodes.

Figure 4A:
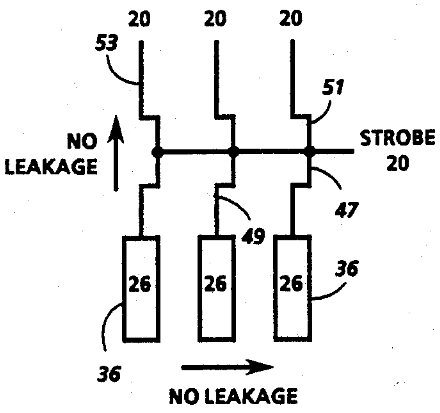
Figure 4B:
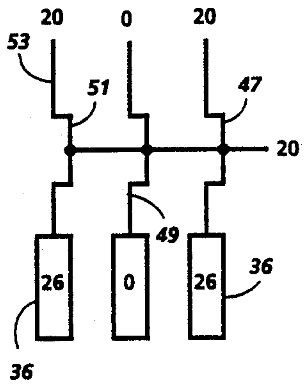

With reference to FIG. 4a, when writing all white dots and the data voltage of the source electrode 53 equals the strobe voltage at the gate electrode 51, i.e. 20 volts, for example, the TFT or switch 47 shuts off and no leakage from the modulating electrode 36 back through the switch 47 is allowed. The potential difference in the outlet channel 26 charges the pixel electrodes 36 positively and the pixel electrode 36 become more positive, for example, 26 volts, than the input data voltages. With reference to FIG. 4b, there is illustrated the attempt to write a one bit black line, i.e. zero voltage at the source gate 53 of the middle pixel electrode. The one bit black line pixel electrode immediately goes to zero, but neighboring white pixel electrodes are over modulated at +26 volts as illustrated.

Figure 4C:
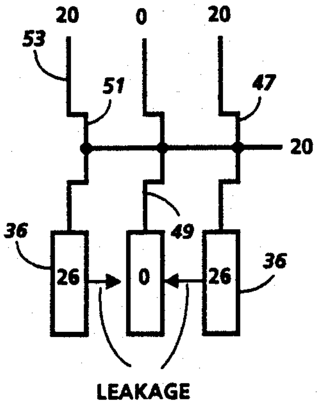
Figure 4D:
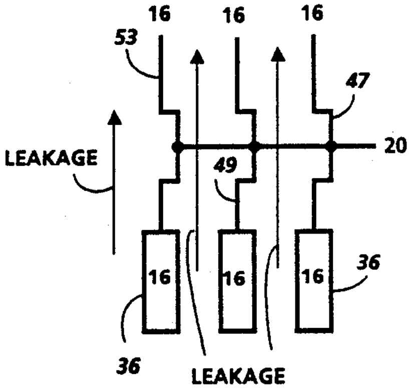
Figure 4E:
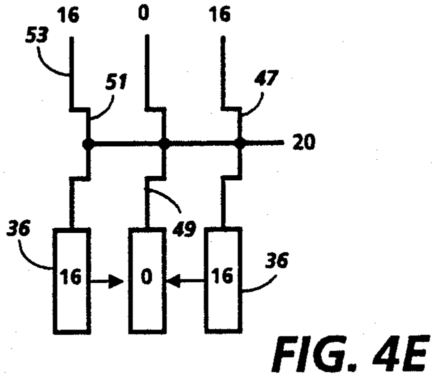

With reference to FIG. 4c, after many scan lines, the white pixel electrodes 36 leak voltage to the black pixel electrode as illustrated and overmodulation decreases or is eliminated. With reference to FIG. 4d, if the data voltage is less than the strobe voltage, illustrated as 20 volts, there is a leakage path through the switch 47 which allows the current causing overmodulation to bleed off leaving the pixel electrode with approximately 16 volts. Finally, with reference to FIG. 4e, when the one bit black line is written, the neighboring white pixel electrodes 36 are not overmodulated, i.e. illustrated at 16 volts rather than 26 volts.

Thus, cross-talk or vertical line fade out occurs in data voltage and strobe voltage set points where the data voltage is approximately equal to the strobe voltage or greater the the strobe voltage. By lowering the data voltage below the strobe voltage, this phenomenon can be avoided. How far below the strobe voltage the data must be set varies from array to array. Arrays require a difference of up to 5 V between strobe and data voltages to eliminate fade in or cross talk. After eliminating fade in further reductions in the data voltage increase the 1 and 2 pixel (and to a lesser degree wider) vertical line widths. The lower limit on data voltage is the voltage where ions are not shut off completely. The control of the data voltage allows vertical line width to be adjusted to (in conjunction with pixel stretching) to achieve 1 to 1 horizontal to vertical line width ratios.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

We claim:

1. An ion projection device for providing latent images on an image bearing member including:

an ion generator, an inlet channel and an outlet channel connected to the ion generator, a source of transport fluid in communication with the inlet channel for delivering transport fluid to move ions through the outlet channel, the outlet, channel being located near the image bearing member, modulation means located adjacent the outlet channel for controlling the passage of ions therethrough to the image bearing member, the modulation means comprising a plurality of spaced, individually controllable modulation electrodes for neutralizing selected ions in the outlet channel and allowing selected ions to pass to the image bearing member representing a desired charge pattern, and a switch electrically connected to each of the modulation electrodes, each driver responding to a data voltage and a strobe voltage to selectively control the modulation electrode wherein the improvement comprises that the data voltage conveyed to each of the switches is less than the strobe voltage conveyed and each of the switches.

2. The ion projection device of claim 1 wherein each of the switches is a thin film transistor having a source electrode connected to the data voltage, a gate electrode connected to the strobe voltage, and a drain electrode connected to the modulation electrode.

3. The ion projection device of claim 2 wherein the switches are an array of amorphous silicon thin film transistors fabricated on a substrate.

4. The ion projection device of claim 1 wherein the difference between the data voltage and the strobe voltage is in the range of 0–5 volts.

5. In an ion projection device, the device including an image bearing member, an ion generator, an inlet channel and an outlet channel connected to the ion generator, a source of air in communication with the inlet channel to move ions through the outlet channel, the outlet channel being located near the image bearing member, modulation means located adjacent the outlet channel for controlling the passage of ions therethrough to the image bearing member, the modulation means comprising a plurality of spaced, individually controllable modulation electrodes for neutralizing selected ions in the outlet channel and allowing selected ions to pass to the image bearing member representing a desired charge pattern, and a driver electrically connected to each of the modulation electrodes each driver responding to a data signal and a strobe signal to selectively control the modulation electrode, a method of providing lines of uniform resolution on the image bearing member comprising the steps of:

providing a data voltage to each of the drivers, the data voltage representing either a white spot or a black spot to be produced on the image bearing member corresponding to the modulation electrode associated with the driver, conveying a strobe voltage to each of the drivers, the strobe voltage providing a gate signal to the driver, and regulating the potential of the data voltage to be less than the potential of the strobe voltage.

6. The method of claim 5 including the step of minimizing the leakage current between modulation electrodes.

7. The ion projection device of claim 5 wherein each of the drivers is a thin film transistor having a source electrode connected to the data voltage, a gate electrode connected to the strobe voltage, and a drain electrode connected to the modulation electrode.

8. The ion projection device of claim 5 wherein the difference between the data voltage and the strobe voltage is 0–5 volts.

* * * * *